(12) United States Patent
Monaghan et al.

(10) Patent No.: US 9,050,769 B2
(45) Date of Patent: Jun. 9, 2015

(54) PRE-FORM CERAMIC MATRIX COMPOSITE CAVITY AND METHOD OF FORMING AND METHOD OF FORMING A CERAMIC MATRIX COMPOSITE COMPONENT

(75) Inventors: Philip Harold Monaghan, Hockessin, DE (US); John McConnell Delvaux, Fountain Inn, SC (US); Glenn Curtis Taxacher, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 517 days.

(21) Appl. No.: 13/446,465

(22) Filed: Apr. 13, 2012

(65) Prior Publication Data

US 2014/0193577 A1    Jul. 10, 2014

(51) Int. Cl.
*B29C 70/44*    (2006.01)
*B29D 99/00*    (2010.01)
*F01D 5/28*    (2006.01)

(52) U.S. Cl.
CPC ......... *B29D 99/0028* (2013.01); *Y10T 29/4998* (2015.01); *F01D 5/282* (2013.01); *F01D 5/284* (2013.01); *F05D 2300/222* (2013.01)

(58) Field of Classification Search
USPC .......... 264/258, 241, 250, 255, 257, 259, 263
See application file for complete search history.

(56) References Cited

U.S. PATENT DOCUMENTS

| | | | |
|---|---|---|---|
| 5,710,414 A | 1/1998 | Matsen et al. |
| 6,056,915 A | 5/2000 | Behi et al. |
| 6,274,078 B1 | 8/2001 | Dunyak et al. |
| 2010/0196637 A1 | 8/2010 | Lippert et al. |
| 2011/0027098 A1 | 2/2011 | Noe et al. |

*Primary Examiner* — Stella Yi
(74) *Attorney, Agent, or Firm* — McNees Wallace & Nurick LLC

(57) ABSTRACT

A pre-form CMC cavity and method of forming pre-form CMC cavity for a ceramic matrix component includes providing a mandrel, applying a base ply to the mandrel, laying-up at least one CMC ply on the base ply, removing the mandrel, and densifying the base ply and the at least one CMC ply. The remaining densified base ply and at least one CMC ply form a ceramic matrix component having a desired geometry and a cavity formed therein. Also provided is a method of forming a CMC component.

15 Claims, 7 Drawing Sheets

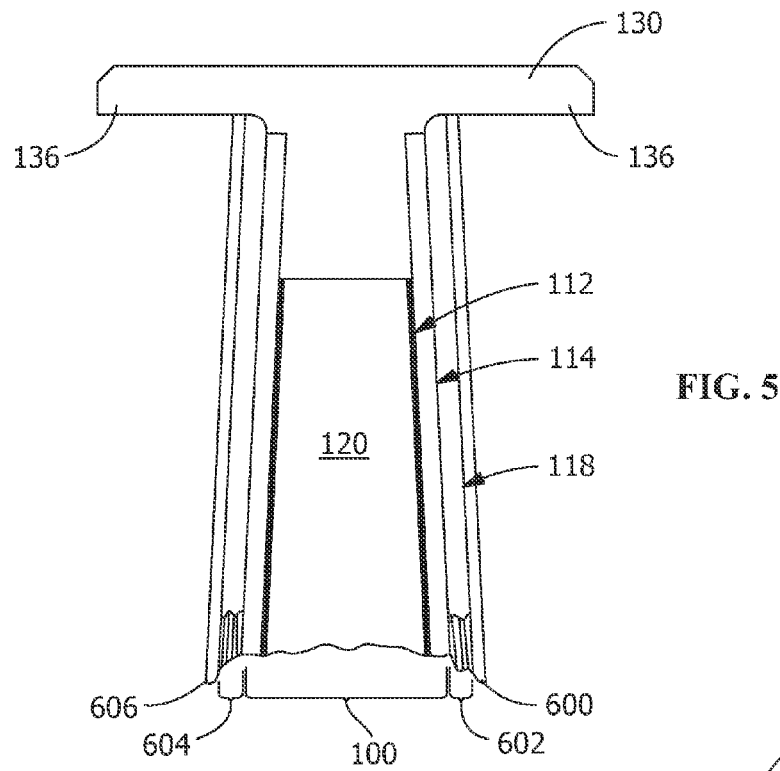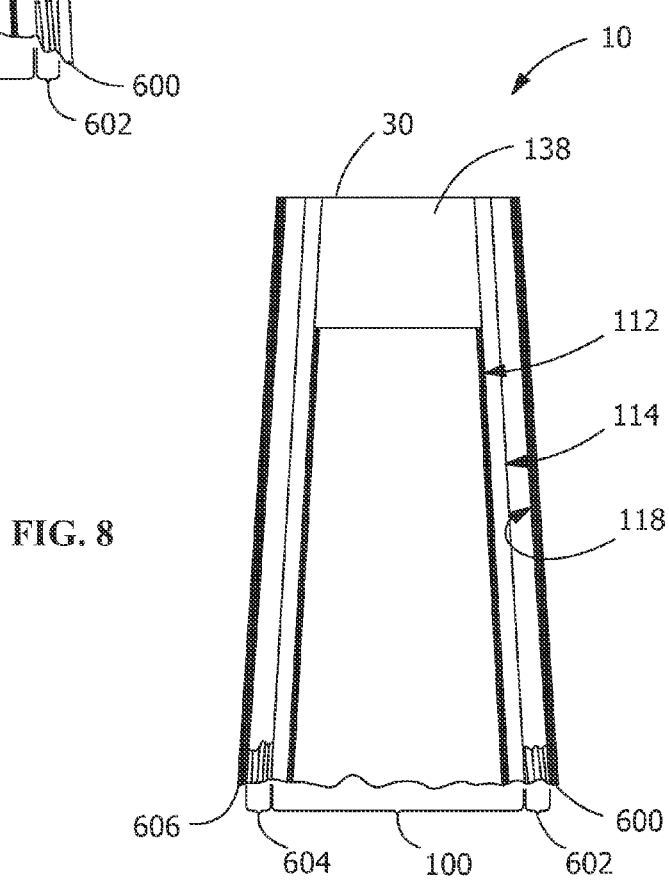

PRE-FORM CERAMIC MATRIX COMPOSITE CAVITY AND METHOD OF FORMING AND METHOD OF FORMING A CERAMIC MATRIX COMPOSITE COMPONENT

STATEMENT REGARDING FEDERALLY SPONSORED RESEARCH

This invention was made with Government support under contract number DE-FC26-05NT42643 awarded by the Department of Energy. The Government has certain rights in the invention.

FIELD OF THE INVENTION

The present invention relates generally to gas turbines for power generation and more specifically to methods of forming ceramic matrix composite components for gas turbines.

BACKGROUND OF THE INVENTION

Silicon carbide (SiC)-based ceramic matrix composite (CMC) materials have been proposed as materials for certain components of gas turbine engines, such as the turbine blades, vanes, nozzles, and buckets. Various methods are known for fabricating SiC-based CMC components, including Silicomp, melt infiltration (MI), chemical vapor infiltration (CVI), polymer inflation pyrolysis (PIP), and oxide/oxide processes. Though these fabrication techniques significantly differ from each other, each involves the use of hand lay-up and tooling or dies to produce a near-net-shape part through a process that includes the application of heat at various processing stages.

As with turbine blades and vanes formed from more conventional superalloy materials, CMC blades and vanes are primarily equipped with cavities and cooling passages to reduce weight, reduce centrifugal load, and reduce operating temperatures of the components. These features are typically formed in CMC components using a combination of removable and expendable tooling.

Forming CMC component with a cavity includes a number of steps, including using pre-forms. First, a plurality of ceramic plies, some of which can include reinforcing material or are pre-impregnated with matrix, are laid up on a mandrel or mold in a pre-determined pattern to provide desired final or near-net-shape and desired mechanical properties of component. The mandrel is generally selected from various polymers, or other meltable materials. The laid-up plies may be pre-impregnated (pre-preg) with matrix material, such as SiC or impregnated with matrix after lay-up of the plies. Prior to rigidization of the CMC pre-form, the mandrel is removed through a burn-out cycle. In the burn-out cycle, the mandrel forming materials, such as, various polymers, or other meltable materials are melted out.

After the burn-out cycle, the CMC pre-form component is very fragile due to burn-off of the volatile substances of the composite. In certain cases, one end of the CMC pre-form requires capping or closing before use in gas turbines in order to close off the hollow region for use in the turbine. In known processes, to close the open end area of the CMC pre-form a cap or plug is inserted after the burnout cycle when the CMC pre-forms are in their most fragile state. The plug can be formed from of a CMC laminate part having a number of plies, and shaped so as to fill the open end of the CMC pre-form. Use of a separate forming, cutting and layup process is time and labor intensive simply to create a closed structure. Challenges also arise with placing the pre-rigidized CMC laminate having a number of plies into the open end. For example, because both the CMC laminate and pre-form are fragile prior to densification, these components can be easily damaged during assembly.

Therefore, a method of forming pre-form ceramic matrix composite cavity, a pre-form ceramic matrix composite cavity, and a method of forming ceramic matrix composite components that do not suffer from the above drawbacks is desirable in the art.

SUMMARY OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

According to an exemplary embodiment of the present disclosure, a method of forming pre-form ceramic matrix composite cavity for a ceramic matrix component is provided. The method includes providing a mandrel and applying a base ply to the mandrel. The method includes laying-up at least one CMC ply on the base ply, removing the mandrel and densifying the base ply and the at least one CMC ply. The remaining densified base ply and at least one CMC ply form a ceramic matrix component having a desired geometry and a cavity formed therein.

According to another exemplary embodiment of the present disclosure, a pre-form ceramic matrix composite cavity for a ceramic matrix composite component is provided. The pre-form ceramic matrix composite cavity includes a cavity conforming to a mandrel geometry. The pre-form ceramic matrix composite cavity includes a densified base ply defining the cavity. The pre-form ceramic matrix composite cavity includes at least one densified lay-up ply applied to the densified base ply. The pre-form ceramic matrix composite having a desired geometry and the cavity formed therein.

According to another exemplary embodiment of the present disclosure, a method of forming a ceramic matrix composite component is provided. The method includes providing a lay-up tool having a first surface and a second surface. The method includes applying a first base ply to the first surface of the lay-up tool. The method includes laying-up a first set of CMC plies adjacent to the first base ply. The method includes providing a pre-form ceramic matrix composite cavity. The pre-form ceramic matrix composite includes a cavity conforming to a mandrel geometry, a densified base ply defining the cavity, and at least one densified lay-up ply applied to the densified base ply, the pre-form ceramic matrix composite cavity having a desired geometry and the cavity formed therein. The method includes placing the pre-form ceramic matrix composite cavity adjacent to the first set of CMC plies in the lay-up tool. The method includes laying-up a second set of CMC plies adjacent to the pre-form ceramic matrix composite cavity. The method includes applying a second base ply to the second set of CMC plies, the second base ply adjacent to the second surface of the lay-up tool. The method includes densifying the first base ply, the first set of CMC plies, the pre-form matrix ceramic composite cavity, the second set of CMC plies, and the second base ply. The ceramic matrix composite is formed having a desired geometry and the cavity formed therein.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 5 is a schematic view of FIG. 4 including air foil shell plies of the present disclosure.

FIG. 8 is sectional schematic view of CMC component of the present disclosure.

Wherever possible, the same reference numbers will be used throughout the drawings to represent the same parts.

DETAILED DESCRIPTION OF THE INVENTION

Figure 1:
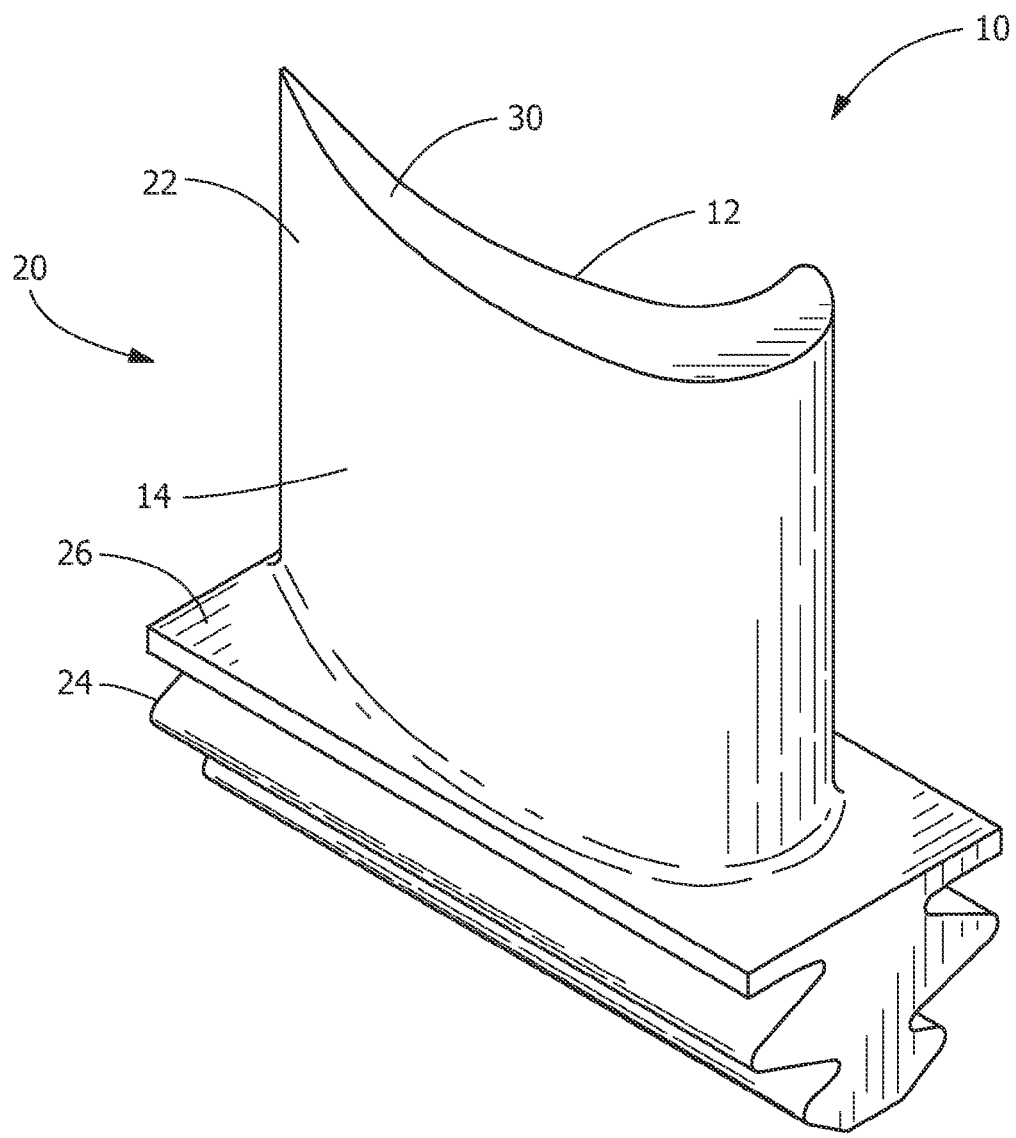
FIG. 1 is a perspective view of a ceramic matrix composite (CMC) component of the present disclosure.

Provided is an economically viable method of forming a ceramic matrix composite (CMC) component, specifically a method of forming a CMC blade or vane, in such a manner that, the CMC components do not suffer from the processing and performance drawbacks in the prior art. One advantage of an embodiment of the present disclosure includes an opening in the bottom cavity to allow for melt-out of the mandrel material and cleaning of the cavity. Yet another advantage is a tip cap and cavity combination that is highly durable because it has undergone densification. Another advantage of an embodiment of the present disclosure includes a reduced ply volume of the blade shell at the time of melt-out of the mandrel material which allows for better control of the melt-out of the mandrel material. Yet another advantage of the present embodiment is that a formed pre-form CMC cavity for forming a CMC component allows for cavity inspections prior to lay-up of the air foil plies, which prevents the loss of the whole component if cavity defects are found. Another advantage is that the tip cap portion of the pre-form ceramic matrix composite cavity can be used for location of the pre-form ceramic matrix composite cavity in the lay-up tool. Yet another advantage is that the method allows for better process control during the autoclave cycle in lay-up tool which enables better dimensional control. Another advantage is that the method allows for using tailored polymers or other mandrel materials for the mandrel that will melt-out or leach out during subsequent processing.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Systems used to generate power include, but are not limited to, gas turbines, steam turbines, and other turbine assemblies such as land based aero-derivatives used for power generation. In certain applications, the power generation systems, including the turbomachinery therein (e.g., turbines, compressors, and pumps) and other machinery may include components that are exposed to heavy wear conditions. For example, certain power generation system components, such as blades, buckets, casings, rotor wheels, shafts, shrouds, nozzles, and so forth, may operate in high heat and high revolution environments. These components are manufactured using ceramic matrix composites and these components may also include cooling passages. The present disclosure provides method to form ceramic matrix composite (CMC) components including cooling passages. An exemplary embodiment of the disclosure is shown in FIGS. 1-8 as a turbine blade, but the present disclosure is not limited to the illustrated structure.

Figure 2:
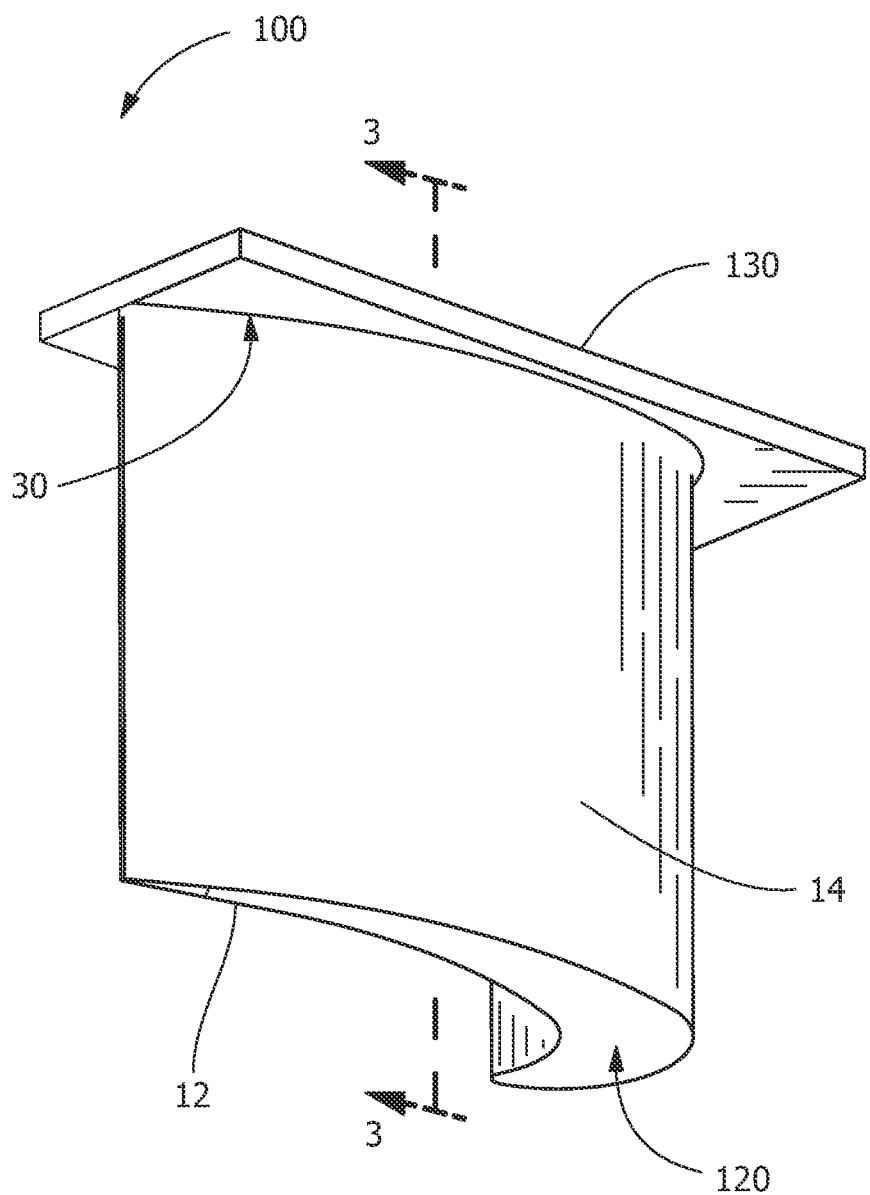
FIG. 2 is a perspective view of pre-form CMC cavity of the present disclosure.

FIG. 1 is a perspective view of a CMC component 10, such as but not limited to a turbine blade 20 or turbine vane. Turbine blade 20 is preferably formed of a ceramic matrix composite (CMC) material. Material for CMC component 10 includes, but is not limited to, an oxide based CMCs such as, but not limited to alumina, mullite, boron nitride, boron carbide, sialons (silicon, aluminum, oxygen, and nitrogen), intermetallics, and combinations thereof A suitable example of material for CMC component 10 is, but not limited to, AN-720 (oxide-oxide based), which is available from COI Ceramics, Inc., San Diego, Calif., or a hybrid oxide CMC material. Suitable examples of materials used to make CMC components 10, include but are not limited to, SiC fibers impregnated with a SiC and carbon matrix with various binders. Turbine blade 20 includes an airfoil 22 against which the flow of hot exhaust gas is directed. Turbine blade 20 is mounted to a turbine disk (not shown) by a dovetail 24 which extends downwardly from airfoil 22 and engages a slot on the turbine disk. A platform 26 extends laterally outwardly from the area where airfoil 22 is joined to dovetail 24. Turbine blade 20 includes at least one cavity 120 as shown in FIG. 2, extending along the interior of airfoil 22. During operation of power generation system, a flow of cooling air is directed through cavity 120 to reduce the temperature of airfoil 22.

Figure 3:
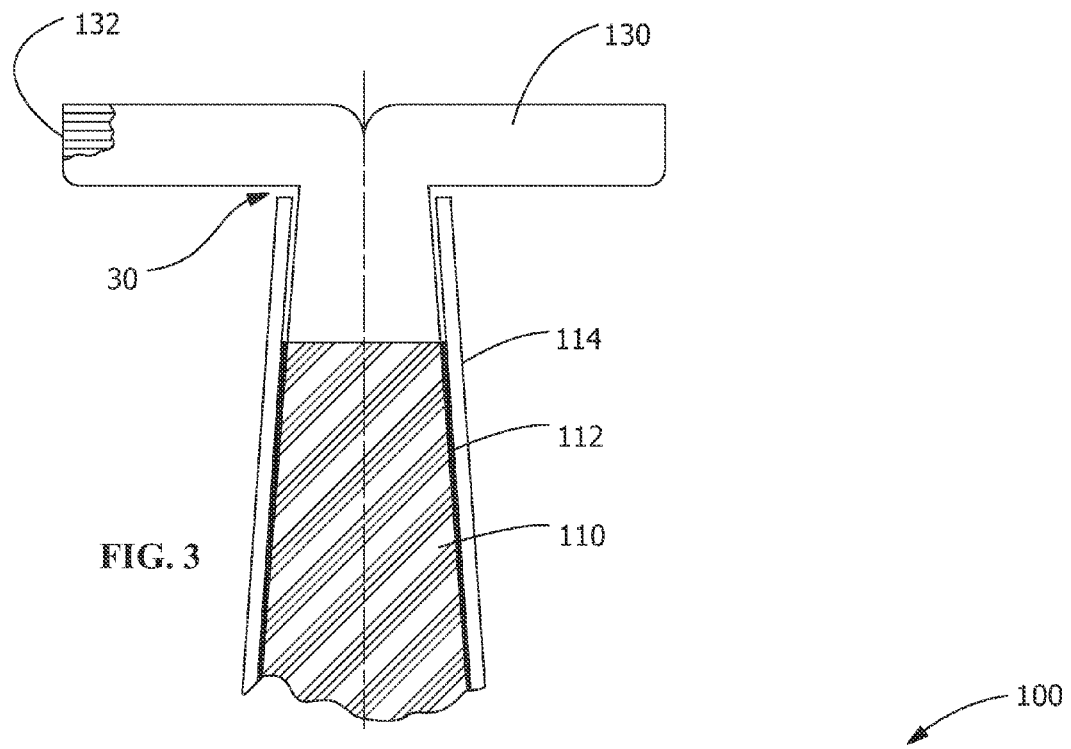
FIG. 3 is a sectional view taken in direction 3-3 of FIG. 2 of the pre-form CMC cavity of the present disclosure.
Figure 4:
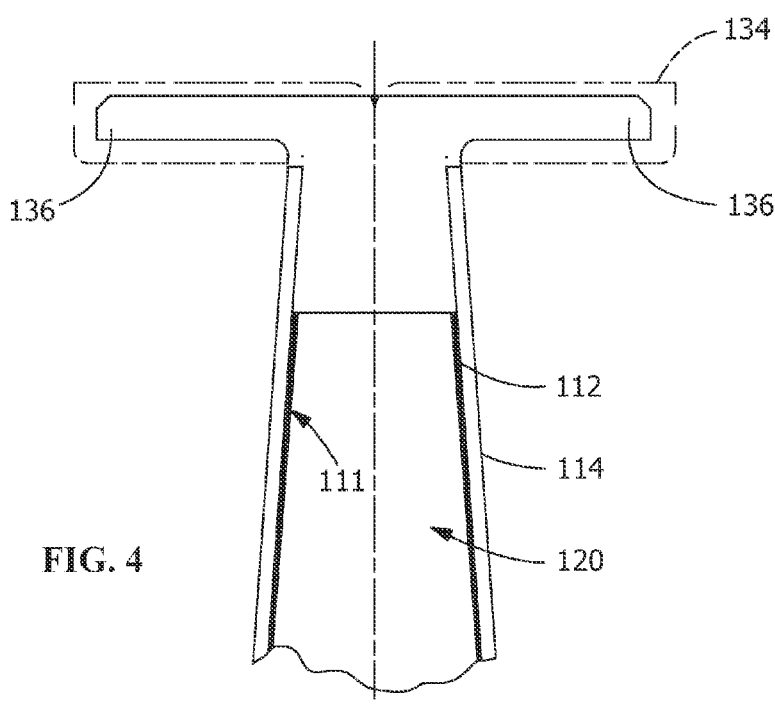
FIG. 4 is a schematic view of FIG. 3 after a mandrel is removed and depicting the pre-form CMC cavity of the present disclosure.

CMC turbine blade 20, as shown in FIG. 1, is constructed using a lay-up technique and a near-net shape pre-form CMC cavity 100 (see FIGS. 2-5). Turbine blade 20 also includes blade tip 30. As shown in FIG. 2, pre-form CMC cavity 100 includes a cavity 120 and a tip member 130 inserted into blade tip 30. Tip member 130 is formed from a plurality of plies 132 constructed separately in a tool or mold. Plies 132 are selected from ceramic plies that can include reinforcing material or are pre-impregnated with a matrix (see FIG. 3). An example of material for plies 132 includes, but is not limited to, carbon, binder material and coated SiC fibers. As shown in FIG. 3, mandrel 110 is used to form pre-form CMC cavity 100. In forming pre-form CMC cavity 100, at least one base ply 112 is applied to mandrel 110. In an alternative embodiment, more than one base plies 112 are applied to the mandrel. An example of suitable material for base ply 112, includes but is not limited to, plies containing carbon, SiC and binders. Next, at least one ceramic matrix composite (CMC) ply 114 is applied to the at least one base ply 112. An example of material for CMC 114 includes but is not limited to carbon, binder materials and coated SiC fiber. After at least one base ply 112 and at least one CMC ply 114 are assembled in desired geometry or shape on mandrel 110, the mandrel 110 is removed. Mandrel 110 material is any material that can be removed from the densified structure by melting or chemical removal methods. Suitable examples of mandrel material include, but are not limited to, polymers, or other meltable or leachable materials. After the mandrel 110 is removed, at least one base ply 112 and at least one CMC ply 114 are densified. Densification includes, but is not limited to melt infiltration, chemical vapor deposition, or other suitable densification methods. After densification, densified base ply 112 and at least one CMC ply 114 form pre-form CMC cavity 100 having a desired geometry and a cavity 120 formed therein, as shown in FIG. 4.

In one embodiment, base ply 112 is applied to mandrel 110 but adjacent to tip member 130. Next, at least one ceramic matrix composite (CMC) ply 114 is applied to the at least one base ply 112 on mandrel 110 and tip member 130, as shown in FIG. 3. After at least one base ply 112 and at least one CMC ply 114 are assembled in desired geometry or shape on mandrel 110, the assembly is autoclave processed and then mandrel 110 is removed, by methods, such as, but not limited to, melt-out or leaching processes depending on the mandrel composition. After removal of mandrel 110, at least one base ply 112, at least one CMC ply 114, and tip member 130 are densified. Densification includes, but is not limited to, melt infiltration, chemical vapor deposition, or other suitable densification methods. Densified base ply 112, at least one CMC ply 114, and tip member 130 form pre-form CMC cavity 100 having a desired geometry and a cavity 120 formed therein, as shown in FIGS. 3-4.

As shown in FIG. 4, mandrel 110 is removed and cavity 120 is formed by mandrel geometry 111 that remains after melt-out of mandrel 110. Also as shown in FIG. 4, in one embodiment, a portion 134 of tip member 130 is removed by machining to create location feature 136 for lay-up tool 200 (see FIG. 6). In another embodiment, no machining is necessary to create location feature 136 for lay-up tool 200.

Figure 7:
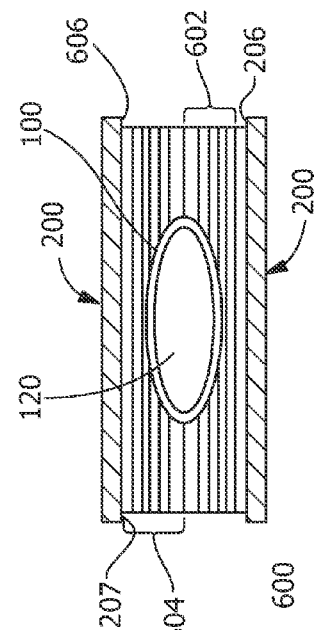
FIG. 7 is schematic view of the layers for the CMC component in the lay-up tool of the present disclosure.
Figure 6:
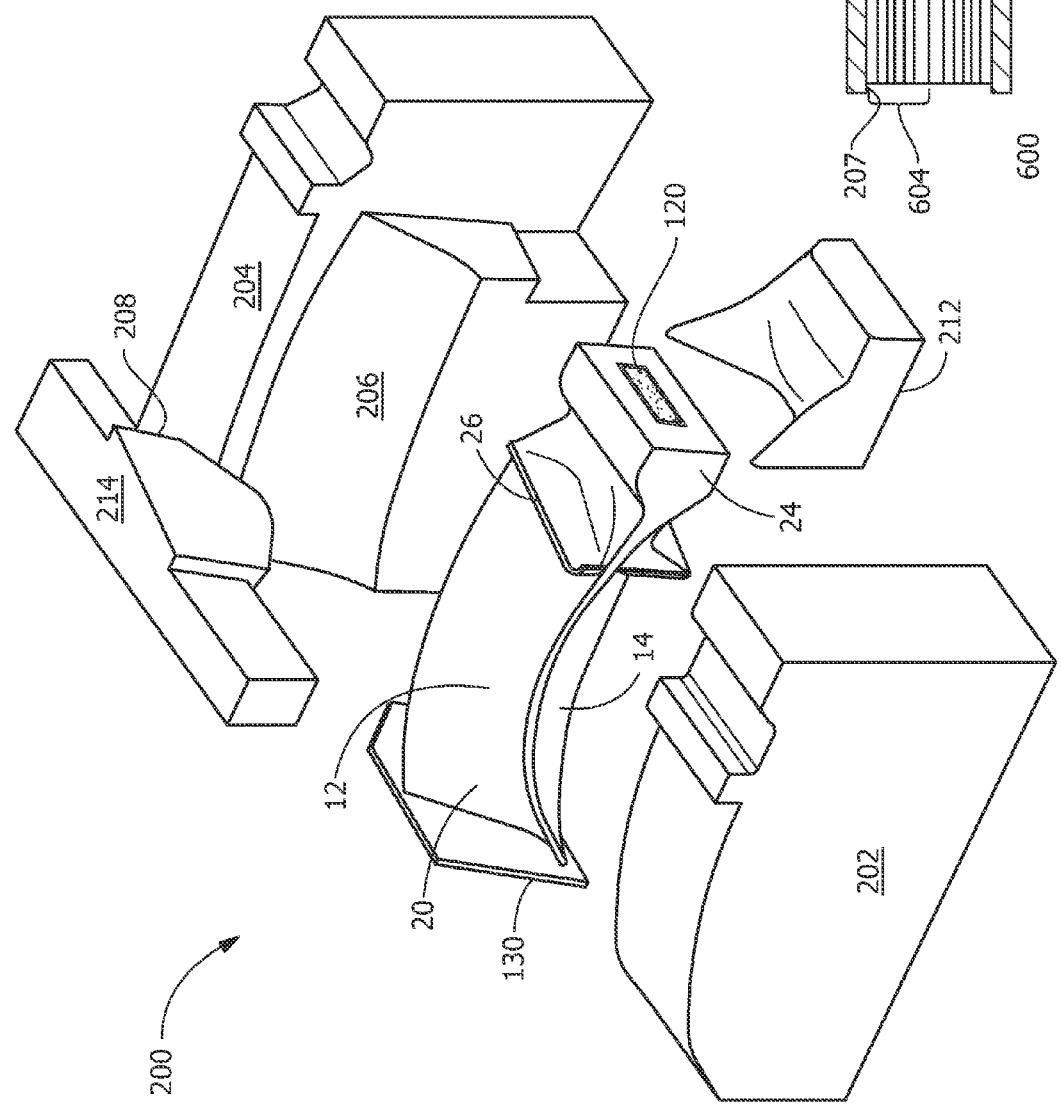
FIG. 6 is a perspective view of the lay-up tool of the present disclosure.

As shown in FIGS. 5-7, pre-form CMC cavity 100 is used in lay-up tool 200 (see FIG. 6) to form CMC component 10 (see FIG. 8). As shown in FIG. 6, lay-up tool 200 can be used for fabricating or pre-forming CMC component 10 including pressure side 12 and suction side 14, dovetail 24, and platform 26. Generally, lay-up tool 200 includes a first set of opposing sides 202, 204 configured to abut each other and be fastened together. As shown in FIG. 6, sides 202, 204 can be arranged as a mold for CMC component 10. Sides 202, 204 can include a first lay-up surface 206 designed to permit fabrication of the desired shape for CMC component 10. Tool 200 further includes a second set of opposing sides 208 configured to provide pressure on airfoil and dovetail 24, respectively (or, in the alternate embodiments, on the blade surrogate). Tool 200 may include a dovetail die 212 and/or a bridge 214 or other structures to provide a selectively configurable surface for laying up preform material, such base ply 112 and CMC plies 114. In one embodiment, the dovetail die 212 may further define a lay-up surface, for example the first lay-up surface. In another embodiment, the dovetail die 212 is configured for the airfoil and dovetail preform and the integral platform preform to be co-densified.

As shown in FIG. 7, in forming component 10, a first baseply 600 is applied to first surface 206 of lay-up tool 200. Next, first set of CMC plies 602 are applied adjacent to first baseply 600. Next, pre-form CMC cavity 100 is applied adjacent to first set of CMC plies 602. Next, a second set of CMC plies 604 is applied adjacent to pre-form CMC cavity 100. A second baseply 606 is applied adjacent to second set of CMC plies 604 and adjacent to second surface 207 of lay-up tool 200. After all of the items are situated in lay-up tool 200, first baseply 600, first set of CMC plies 602, pre-form CMC cavity 100, second set of CMC plies 604, and second baseply 606 an autoclave cycle is completed. The lay-up tool including first baseply 600, first set of CMC plies 602, pre-form CMC cavity 100, second set of CMC plies 604, and second baseply 606 is subject to typical autoclave pressures and temperature cycles used in the industry for composite materials. Autoclaving pulls out any volatiles in remaining in the plies and autoclave conditions can be varied depending on the ply material. After autoclaving a pre-form component having the desired geometry is available. The pre-form component is removed from the tooling and undergoes a burn-out process to remove any remaining mandrel material or additional binders in the pre-form component. The burn-out process is generally conducted at a temperature of approximately 426-648° C. (approximately 800-1200° F.). After burn-out, the pre-form component is placed in a vacuum furnace for densification. Densification can be conducted in a vacuum furnace having an established atmosphere at temperature above 1200° C. to allow silicon or other materials to melt-infiltrate into the pre-form component. During densification the pre-form component, having a geometry like that of the component 10 and including first baseply 600, first set of CMC plies 602, pre-form CMC cavity 100, second set of CMC plies 604, and second baseply 606 is melt-infiltrated with Silicon or other materials to provide rigidity to CMC component 10.

Figure 9:
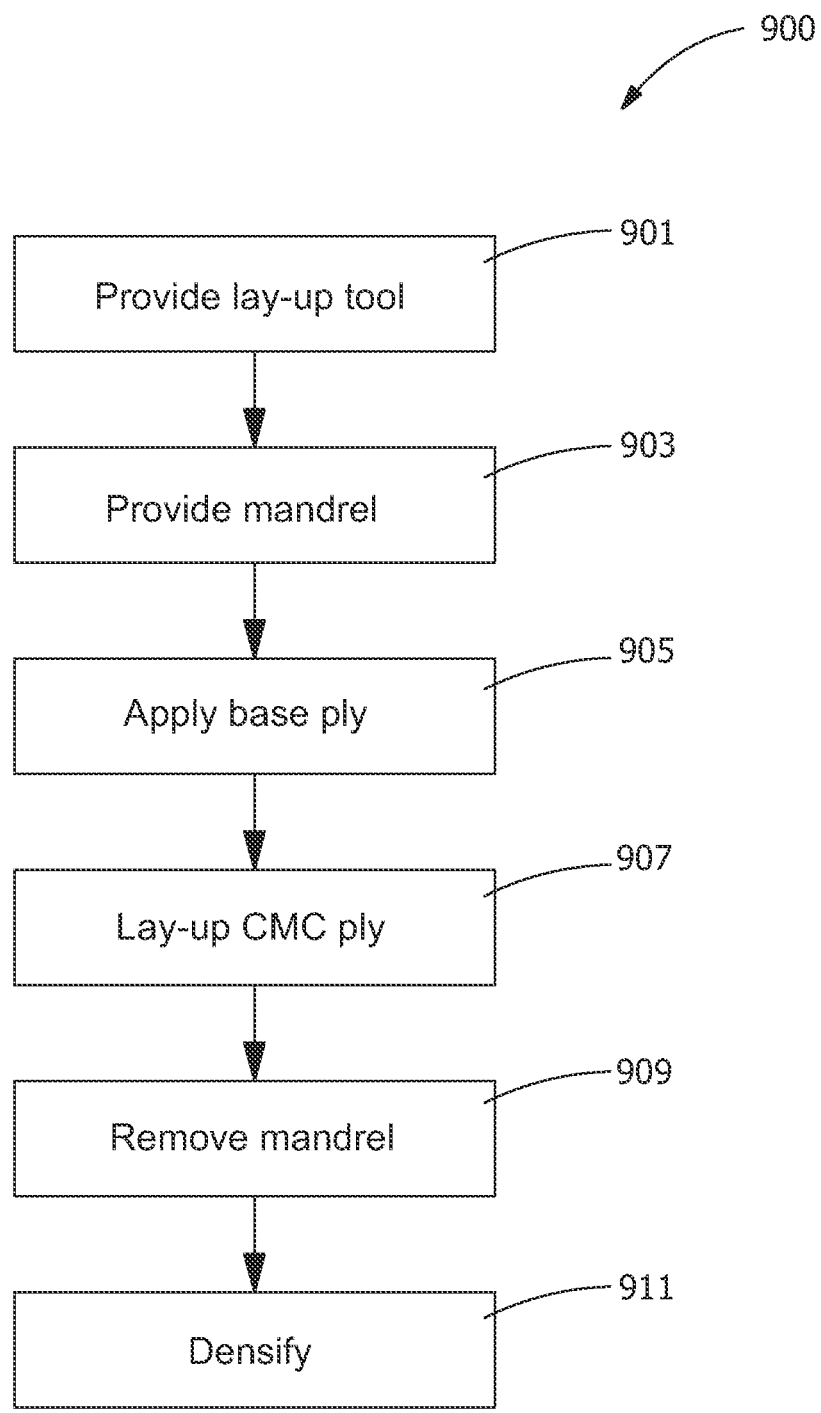
FIG. 9 is a flow chart of the method of making the pre-from ceramic matrix composite of the present disclosure.

A method 900 of forming a pre-form CMC cavity 100 is shown in FIG. 9. Method 900 includes providing lay-up tool, step 901. Method 900 includes providing mandrel 110 (see FIG. 3), step 903. Method include applying base ply 112 to mandrel 110 and optionally applying base ply 112 to tip member 130 (if present) (see FIG. 3), step 905. Method 900 includes laying-up at least one CMC ply 114 adjacent to base ply 112 on mandrel 110 in a lay-up tool(see FIG. 3), step 907. Method 900 includes removing mandrel 110 (see FIG. 4), step 909. After mandrel 110 is removed, base ply 112, and at least one CMC ply 114, are densified, step 911. Method 900 includes removing mandrel 110 using any suitable method, such as but not limited to melting or leaching. After the step of densifying, step 911, a pre-from CMC cavity 100 remains having cavity 120 conforming to mandrel geometry 111, as shown in FIG. 4.

Figure 10:
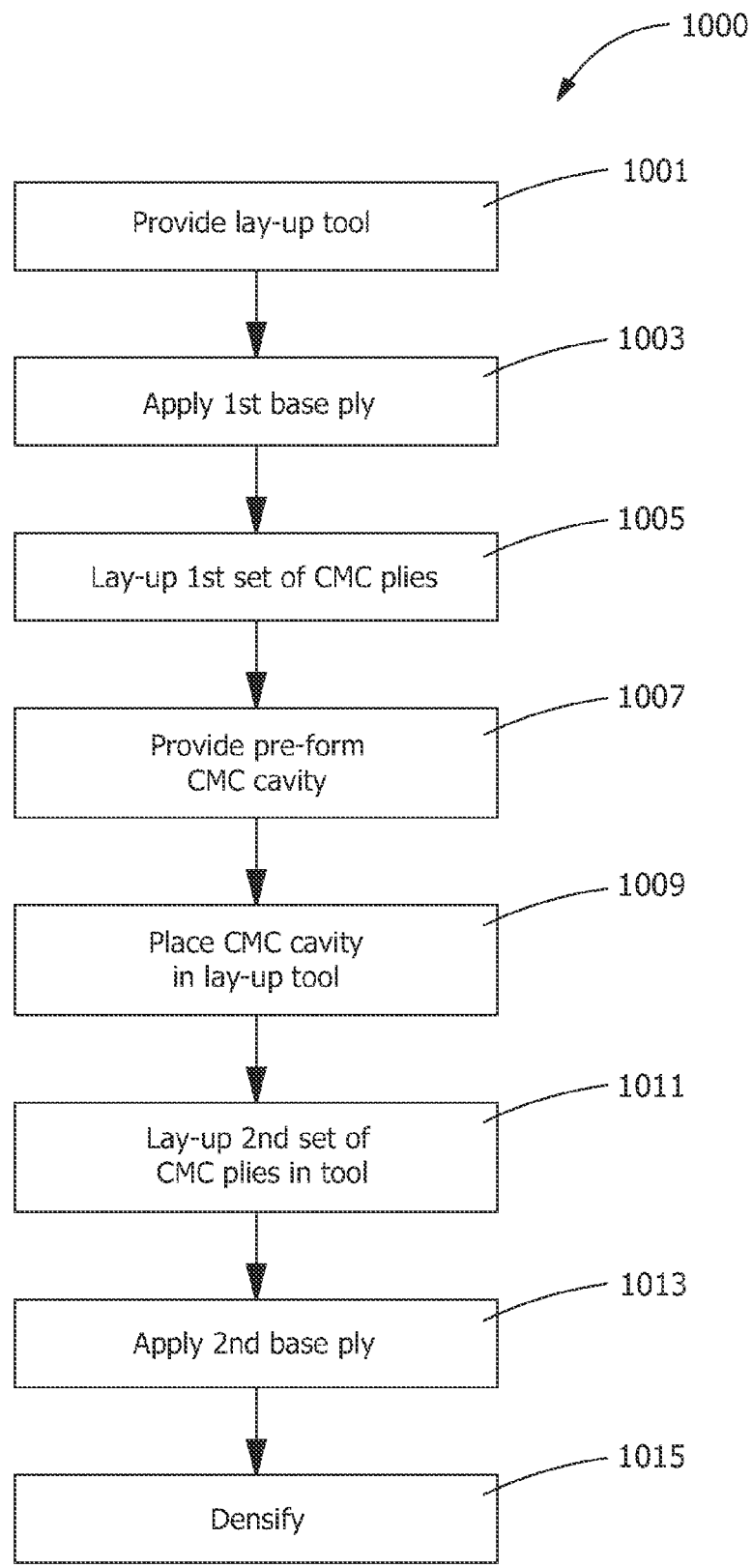
FIG. 10 is a flow chart of the method of making a CMC component of the present disclosure.

A method 1000 of forming a CMC component 10 is shown in FIG. 10. Method 1000 includes providing lay-up tool 200 (see FIG. 6), step 1001. Method 1000 includes applying first baseply 600 to first surface 206 of lay-up tool 200 (see FIG. 7), step 1003. Method 1000 includes laying up first set of CMC plies 602 adjacent to first baseply 600 on first surface 206 of lay-up tool (see FIG. 7), step 1005. Method 1000 includes providing pre-form CMC cavity 100 (see FIG. 5), step 1007. Pre-form CMC cavity 100 includes cavity 120 conforming to mandrel geometry 111, densified base ply 112 defining cavity 120 and at least one densified lay-up ply applied to densified base ply 112 (see FIG. 4). Method 1000 includes placing pre-form CMC cavity 100 adjacent to first set of CMC plies 602 in lay-up tool 200 (see FIG. 7), step 1009. Method 1000 includes laying-up a second set of CMC plies 604 adjacent to pre-form CMC cavity 100 in lay-up tool 200 (see FIG. 7), step 1011. Method 1000 includes applying second baseply 606 to second set of CMC plies 604, second baseply 606 being adjacent to second surface 207 of lay-up tool 200 (see FIG. 7), step 1013. Method 1000 includes densifying first baseply 600, first set of CMC plies 602, pre-from CMC cavity 100, second set of CMC plies 604, and second baseply 606 (see FIG. 7), to form CMC component 10, step 1015. Prior to the step of densifying, step 1015, all of the items are situated in lay-up tool 200, first baseply 600, first set of CMC plies 602, pre-form CMC cavity 100, second set of CMC plies 604, and second baseply 606 are autoclaved. After autoclaving a pre-form component having the desired geometry is removed from the lay-up tool 200 and undergoes a burn-out cycle. After burn-out, the pre-form component is placed in a vacuum furnace for densification. After densification formed CMC component 10 (see FIG. 1), includes a cavity 120 formed therein (see FIG. 8). After formation, component 10 can be machined to remove additional material from tip member 130 to form tip cap 138 (see FIG. 8).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of forming pre-form ceramic matrix composite (CMC) cavity for a ceramic matrix component comprising steps of:
   providing a mandrel;
   applying a base ply to the mandrel;
   laying-up at least one CMC ply on the base ply;
   removing the mandrel;
   densifying the base ply and the at least one CMC ply; and
   wherein the densified base ply and at least one CMC ply form the pre form ceramic matrix component cavity having a desired geometry and a cavity formed therein, the cavity extending along an interior space in the component and wherein the cavity remains when the pre-form CMC cavity is subjected to subsequent laying up of additional CMC plies, autoclaving and densification.

2. The method of claim 1, including an additional step prior to the step of applying the base ply to the mandrel of aligning a tip member adjacent to the mandrel.

3. The method of claim 2, including an additional step after removing the mandrel of machining the tip member to remove additional material.

4. The method of claim 1, including an additional step after removing the mandrel of laying-up a first set of CMC plies in a lay-up tool and applying the pre-form ceramic matrix composite cavity to the first set of CMC plies in the lay-up tool.

5. The method of claim 4, including an additional step after the step of applying the pre-form ceramic matrix composite cavity of laying-up a second set of CMC plies to the pre-form ceramic matrix composite cavity.

6. The method of claim 5, including an additional step after laying-up the second set of CMC plies of processing the first set of CMC plies, the pre-form ceramic matrix composite cavity, and the second set of CMC plies in the lay-up tool to form the ceramic matrix composite component.

7. The method of claim 1, wherein the step of densifying includes melt infiltration or chemical vapor deposition.

8. The method of claim 1, wherein the step of removing the mandrel includes heat or chemical removal methods.

9. A method of forming a ceramic matrix composite (CMC) component comprising steps of:
   providing a lay-up tool having a first surface and a second surface;
   applying a first base ply to the first surface of the lay-up tool;
   laying-up a first set of CMC plies adjacent to the first base ply;
   providing a pre-form ceramic matrix composite cavity comprising:
      a cavity conforming to a mandrel geometry;
      a densified base ply defining the cavity; and
      at least one densified lay-up ply applied to the densified base ply, the pre-form ceramic matrix composite cavity having a desired geometry and the cavity formed therein, the cavity forming an interior space in the component;
   placing the pre-form ceramic matrix composite cavity adjacent to the first set of CMC plies in the lay-up tool;
   laying-up a second set of CMC plies adjacent to the pre-form ceramic matrix composite cavity;
   applying a second base ply to the second set of CMC plies, the second base ply adjacent to the second surface of the lay-up tool;
   after the step of applying the second base ply, autoclaving the first base ply, the first set of CMC plies, the pre-form ceramic matrix composite cavity, the second set of CMC plies, and the second base ply; and
   densifying the first base ply, the first set of CMC plies, the pre-form ceramic matrix composite cavity, the second set of CMC plies, and the second base ply;
   wherein the ceramic matrix composite is formed having a desired geometry and the cavity formed therein.

10. The method of claim 9, wherein the ceramic matrix composite cavity includes a tip member.

11. The method of claim 9, including an additional step of after the step of densifying of inserting a tip member into the pre-from ceramic matrix composite cavity.

12. The method of claim 9, including an additional step after the step of densifying of machining the ceramic matrix composite to a desired geometry.

13. The method of claim 9, wherein the step of densifying includes melt infiltration or chemical vapor deposition.

14. The method of claim 9, including an additional step of after the step of autoclaving of removing the tool.

15. The method of claim 14, including an additional step after the step of removing the tool of burn-out of the first base ply, the first set of CMC plies, the pre-form ceramic matrix composite cavity, the second set of CMC plies, and the second base ply.

* * * * *